No. 875,477.
PATENTED DEC. 31, 1907.
F. WEBER.
WAGON.
APPLICATION FILED AUG. 28, 1907.
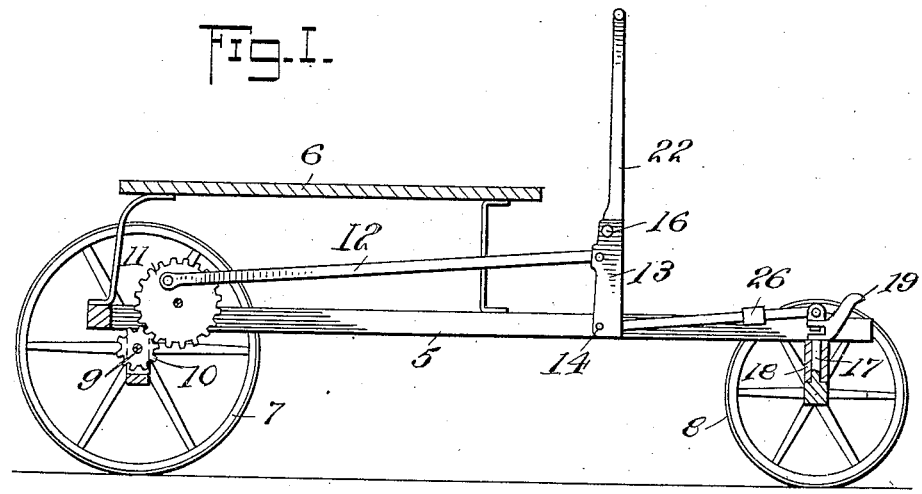
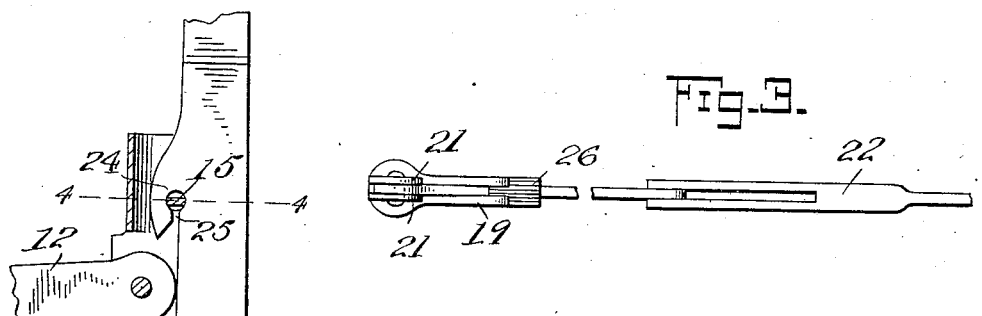
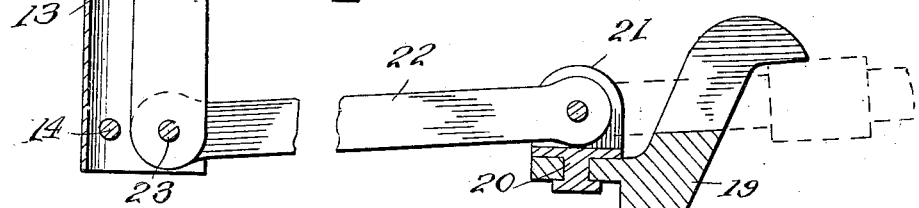
WITNESSES
G. R. Thomas
INVENTOR
Frank Weber
BY
ATTORNEYS

UNITED STATES PATENT OFFICE.

FRANK WEBER, OF NEW YORK, N. Y.

WAGON.

No. 875,477.  Specification of Letters Patent.  Patented Dec. 31, 1907.

Application filed August 28, 1907. Serial No. 390,428.

*To all whom it may concern:*

Be it known that I, FRANK WEBER, a citizen of the United States, and a resident of the city of New York, borough of Manhattan, in the county and State of New York, have invented new and useful Improvements in Wagons, of which the following is a full, clear, and exact description.

This invention is an improvement in children's wagons, relating more especially to that type of wagon commonly known as the "Irish mail", and which is driven by the operation of a hand-lever.

The object of the present invention primarily is to provide a construction in which the hand-lever may be disconnected from the driving mechanism and used as an ordinary tongue for pulling and guiding the wagon; this changing of the handle or lever from one position to the other being readily effected in a novel manner as hereinafter pointed out.

Reference is to be had to the accompanying drawings forming a part of this specification, in which similar characters of reference indicate corresponding parts in all the views.

Figure 1 is a longitudinal vertical section through a wagon, embodying my improvement; Fig. 2 is a view of the hand-lever and adjacent parts on an enlarged scale and partly in section, showing in dotted outline the position taken by the lever or handle when it is used as a tongue; Fig. 3 is a plan of the handle or lever when used as a tongue, and Fig. 4 is a cross section substantially on the line 4—4 of Fig. 2.

In the construction of my improved wagon, I preferably employ the usual frame 5 having the seat 6 supported in an elevated position at the rear end of the frame, the latter being mounted on suitable wheels 7 and 8 arranged near its opposite ends. The axle 9 of the rear wheel has rigidly connected thereto a pinion 10 which meshes with a somewhat larger pinion 11 journaled on the frame 5.

To the pinion 11 is eccentrically connected the usual link 12, which, instead of being directly pivoted at its opposite and forward end to the operating lever, is pivotally connected between the walls of a U-shaped casing 13, an opening being made in the rear edge of this casing for the reception of the link, as clearly illustrated in Fig. 2.

The casing 13 is attached to the frame 5 on a pivot 14 which is located near its bottom edge, and is further provided with a cross-pin 15 preferably arranged above the connection with the link 12; this pin, as shown in Fig. 4, being flattened at opposite sides at that part of its length arranged between the walls of the casing, and is provided with heads at its opposite ends, one of which is knurled or otherwise fashioned and sufficiently extended to provide an operating handle 16 by which the pin may be revolved.

As shown in Fig. 1, the front axle-tree of the wagon is rigidly connected with a king-pin 17 which passes through the bolster block 18 where it is provided with a slotted head having an off-set hook or member 19 directed to the front of the wagon; the said member being vertically bifurcated or slotted, as best shown in Fig. 3.

Swiveled to the slotted head of the pin 17 is a stud 20 constructed with upwardly projecting ears 21, between which is pivoted a handle 22, the said handle having a jointed connection intermediate its length, as at the point 23, dividing it into two sections, the outer section being thickened to snugly fit between the casing 13, and is slotted, as shown in Fig. 3, for receiving the inner section.

The outer section of the handle is provided at its inner edge with a depending finger 24 which has a beveled extremity and is separated from the edge of the handle by a slot 25 sufficiently wide to slide over the flattened portion of the pin 15, the said slot leading into an aperture which fits said pin, as best shown in Fig. 2.

It is apparent from this construction that when the flattened portion of the pin is vertically turned, the handle 22 may be readily lifted out of the casing 13, but when the flattened portion of this pin is turned cross-wise and engaged with the aperture of the outer section of the handle, the latter will be securely fixed within the casing and may be used as a hand-lever for driving the propelling mechanism. By swivelly connecting the handle 22 by the stud 20 the wagon may be steered with the feet in the usual manner.

When the handle 22 is to be used as a tongue for the wagon, the outer section is disengaged from the casing 13 and is brought forwardly until the inner section passes to the bottom of the slot in the off-set member 19, thus operating to prevent any relative rotation between the handle and the king-pin, which permits the front wheels of the wagon to be swung by the tongue as in the ordinary wagon construction.

For preventing the separation of the handle from the member 19, the inner section is provided with a block or other enlargement 26 which is slidable thereon and adapted to be passed underneath the under edge of said member, as shown in dotted outline in Fig. 2, thus securely locking these parts together and enforcing all movement of the tongue in a vertical plane when drawing the wagon to take place on the pivot 23.

While I have shown and described the preferred form of my improved vehicle, I recognize that it may be modified in numerous particulars within the scope of my invention as defined in the annexed claims.

Having thus described my invention, I claim as new and desire to secure by Letters Patent:

1. In a vehicle, a propelling mechanism, a steering mechanism, and a handle adapted to be interchangeably used as a tongue for the steering mechanism and as an operating-lever for the propelling mechanism without disconnecting it from the vehicle.

2. In a vehicle having propelling means, a handle composed of two sections pivoted together, means for rigidly connecting one of said sections to the front axle of the vehicle whereby the handle may be used as a tongue, and means adapting the other of said sections to be used as a hand-lever for the propelling means while the first-named section remains inactive.

3. In a vehicle having propelling means, a king-pin rigidly attached to the front axle of the vehicle, a handle swiveled to the head of said pin composed of two sections pivoted together, means for detachably connecting the inner section of the handle to the head of said pin to provide a tongue, and means for detachably connecting the outer section of said handle to the propelling means to serve as a hand-lever.

4. In a vehicle having propelling means, a handle swivelly connected to the vehicle composed of two sections pivoted together, and means for detachably connecting the outer section with the propelling means to serve as an operating lever therefor without disconnecting the inner section of the handle from the vehicle.

5. In a vehicle, a propelling mechanism, a steering mechanism, a handle composed of two sections, the outer section being adapted to be interchangeably used as a tongue for the steering mechanism and as an operating-lever for the propelling mechanism, and means permanently connecting the inner section of the handle to the vehicle.

6. In a vehicle, propelling means including a casing, a king-pin rigidly connected with the front axle-tree of the vehicle having a slotted head provided with a vertically bifurcated off-set member, a handle swivelly connected with said slotted head composed of two sections pivoted together, means for detachably connecting the outer section of said handle to said casing, and means for locking the inner section of said handle within the bifurcation of said member.

7. In a vehicle, propelling means including a casing, a king-pin rigidly connected with the front axle-tree of the vehicle having a slotted head provided with a vertically bifurcated off-set member, a handle swivelly connected with said slotted head composed of two sections pivoted together, a depending finger formed on the outer section of the handle having an aperture provided with a connecting slot, a flattened pin carried by the casing adapted to pass through the slot and into the aperture of said finger, and a slidable member carried by the inner section of the handle for engaging the under edge of said member for the purpose described.

8. In a vehicle, propelling means including a pivoted casing, a handle composed of two sections pivoted together, the outer section of which is provided with an aperture having a connecting slot, and a pin carried by the casing adapted to fit said aperture and having flattened sides for passing it thereinto through said slot.

9. In a vehicle, a king-pin rigidly connected with the front axle-tree having a head provided with a bifurcated off-set member, a handle swiveled to the head of the pin composed of two sections pivoted together, and a device slidable on the inner section of said handle for locking it to the said member when arranged in the bifurcation thereof.

In testimony whereof I have signed my name to this specification in the presence of two subscribing witnesses.

FRANK WEBER.

Witnesses:
W. W. HOLT,
JOHN P. DAVIS.